(12) United States Patent
Hakola et al.

(10) Patent No.: US 12,101,811 B2
(45) Date of Patent: Sep. 24, 2024

(54) CHANNEL ACCESS FOR WIRELESS COMMUNICATIONS

(71) Applicant: Nokia Technologies Oy, Espoo (FI)

(72) Inventors: Sami Hakola, Kempele (FI); Kari Hooli, Oulu (FI); Esa Tiirola, Kempele (FI)

(73) Assignee: Nokia Technologies Oy, Espoo (FI)

( * ) Notice: Subject to any disclaimer, the term of this patent is extended or adjusted under 35 U.S.C. 154(b) by 457 days.

(21) Appl. No.: 17/629,023

(22) PCT Filed: Aug. 27, 2019

(86) PCT No.: PCT/FI2019/050605
§ 371 (c)(1),
(2) Date: Jan. 21, 2022

(87) PCT Pub. No.: WO2021/038121
PCT Pub. Date: Mar. 4, 2021

(65) Prior Publication Data
US 2022/0272753 A1    Aug. 25, 2022

(51) Int. Cl.
*H04W 74/0816* (2024.01)
*H04W 16/28* (2009.01)
(Continued)

(52) U.S. Cl.
CPC ....... *H04W 74/0816* (2013.01); *H04W 16/28* (2013.01); *H04W 72/046* (2013.01); *H04W 74/0866* (2013.01)

(58) Field of Classification Search
CPC ............. H04W 74/0816; H04W 16/28; H04W 72/046; H04W 74/0866; H04W 16/14;
(Continued)

(56) References Cited

U.S. PATENT DOCUMENTS

2017/0251464 A1* 8/2017 Mukherjee ........ H04W 74/0866
2018/0115996 A1   4/2018 Si et al.
(Continued)

FOREIGN PATENT DOCUMENTS

WO    2019/079500 A1     4/2019
WO  WO-2020091566 A1 *  5/2020

OTHER PUBLICATIONS

"New SID on NR waveform beyond 52.6GHz", 3GPP TSG RAN Meeting #79, RP-180453, Agenda: 9.1.2, Qualcomm, Mar. 19-22, 2019, 4 pages.
(Continued)

*Primary Examiner* — Ivan O Latorre
(74) *Attorney, Agent, or Firm* — Barta Jones, PLLC (57) ABSTRACT

According to an example aspect of the present invention, there is provided a method, comprising: receiving, by a first device from a second device, a message on a wireless medium indicating that the wireless medium has been reserved for at least one transmission from the first device to the second device by the second device detecting that the wireless medium is not occupied, based on a first beamwidth. The method further comprises determining, by the first device, a second beamwidth for performing the at least one transmission, selecting, by the first device on the basis of the received message, a method for the first device, from a set of at least two methods, to determine whether the wireless medium is occupied, determining, by the first device, based on the selected method for the first device whether the wireless medium is occupied, and in response to detecting that the wireless medium is not occupied, performing the at least one transmission by the first device.

20 Claims, 5 Drawing Sheets

(51) Int. Cl.
*H04W 72/044* (2023.01)
*H04W 74/08* (2024.01)

(58) Field of Classification Search
CPC .......... H04W 74/006; H04W 74/0808; H04B 7/086; H04B 7/0617; H04L 5/0053
See application file for complete search history.

(56) References Cited

U.S. PATENT DOCUMENTS

| | | | |
|---|---|---|---|
| 2018/0191547 A1* | 7/2018 | Mukherjee | H04W 72/0446 |
| 2019/0132857 A1* | 5/2019 | Babaei | H04W 72/23 |
| 2019/0132882 A1* | 5/2019 | Li | H04W 74/0833 |
| 2019/0149380 A1* | 5/2019 | Babaei | H04W 72/23 370/330 |
| 2019/0215866 A1* | 7/2019 | Falahati | H04W 16/14 |
| 2019/0230706 A1 | 7/2019 | Li et al. | |
| 2020/0314896 A1* | 10/2020 | Koorapaty | H04L 27/2636 |
| 2021/0368541 A1* | 11/2021 | Hedayat | H04L 5/005 |
| 2021/0385850 A1* | 12/2021 | Yoshioka | H04W 72/23 |
| 2022/0022252 A1* | 1/2022 | Lee | H04W 76/18 |
| 2022/0060305 A1* | 2/2022 | Ijaz | H04L 5/0082 |
| 2022/0272753 A1* | 8/2022 | Hakola | H04B 7/086 |
| 2022/0322452 A1* | 10/2022 | You | H04W 74/0808 |
| 2022/0346126 A1* | 10/2022 | Li | H04L 5/0044 |
| 2023/0084632 A1* | 3/2023 | Xie | H04W 74/0833 370/329 |
| 2023/0232452 A1* | 7/2023 | Li | H04W 74/002 370/329 |
| 2024/0057134 A1* | 2/2024 | Niu | H04W 74/0808 |

OTHER PUBLICATIONS

"New SID: Study on NR design above 52.6GHz", 3GPP TSG RAN Meeting #79, RP-180320, Agenda: 9.1.2, Intel Corporation, Mar. 19-22, 2018, 4 pages.

"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.

"Multiple-Gigabit/s radio equipment operating in the 60 GHz band; Harmonised Standard covering the essential requirements of article 3.2 of Directive 2014/53/EU", ETSI EN 302 567, V2.1.1, Jul. 2017, pp. 1-40.

"IEEE Standard for Information Technology—Local and Metropolitan Area Networks—Specific Requirements Part 11: Wireless LAN MAC and PHY Specifications", IEEE Computer Society, IEEE Std 802.11-2016, 2016, 2 pages.

International Search Report and Written Opinion received for corresponding Patent Cooperation Treaty Application No. PCT/FI2019/050605, dated Apr. 17, 2020, 18 pages.

"Coexistence and channel access for NR unlicensed band operations", 3GPP TSG RAN WG1 Meeting #95, R1-1812194, Agenda: 7.2.2.4.1, Huawei, Nov. 12-16, 2018, 13 pages.

* cited by examiner

Fig. 7

CHANNEL ACCESS FOR WIRELESS COMMUNICATIONS

RELATED APPLICATION

This application was originally filed as PCT Application No. PCT/FI2019/050605, filed on 27 Aug. 2019, each of which is incorporated herein by reference in its entirety.

FIELD

Various example embodiments relate to arranging channel access for wireless communications, particularly in unlicensed spectrum.

BACKGROUND

Wireless medium channel utilization may be based on sharing many frequencies in many wireless networks, such as wireless local area networks. In case of shared channels, users tune on the same channel and try to transmit data. To avoid collisions, several access techniques exist, such as the carrier sense multiple access (CSMA).

In unlicensed access different networks may share an unlicensed channel. The unlicensed channel may be shared by networks of different radio access technologies (RATs). Operation in unlicensed spectrum is regulated by certain channel access rules that target at fair spectrum use among different RATs on the same shared unlicensed spectrum. Various listen-before-talk (LBT) methods have been developed for arranging channel access and coexistence in wireless networks.

Spatial reuse enables to improve network capacity, and algorithms have been studied and proposed for enabling spatial reuse. Directional antennas may be applied for mitigating co-channel interference by using narrow RF radiation patterns, i.e. narrow beams, for transmissions. In beamforming, phases of the antennas are aligned such that they add up constructively, to provide gain of the signal in a desired direction. In null-steering the phases are aligned to decrease interference caused to devices in other directions.

With the increasing number of wireless devices and networks, there are more overlapping networks, and transmissions causing interference to neighbouring networks. There is a demand to further develop and improve technologies facilitating channel access for beam based access in unlicensed spectrum.

SUMMARY

Some aspects of the invention are defined by the features of the independent claims. Some specific embodiments are defined in the dependent claims.

According to a first aspect of the present invention, there is provided a method, comprising: receiving, by a first device from a second device, a message on a wireless medium indicating that the wireless medium has been reserved for at least one transmission from the first device to the second device, and that the wireless medium has been reserved by the second device detecting that the wireless medium is not occupied, wherein said detecting by the second device is based on a first beamwidth. The method further comprises determining, by the first device, a second beamwidth for performing the at least one transmission, selecting, by the first device on the basis of the received message, a method for the first device, from a set of at least two methods, to determine whether the wireless medium is occupied, determining, by the first device, based on the selected method for the first device whether the wireless medium is occupied, and in response to detecting that the wireless medium is not occupied, performing the at least one transmission by the first device.

According to a second aspect of the present invention, there is provided a method, comprising: determining, by a second device, a first beamwidth for a transmission between a first device and the second device, determining, by the second device, based on the first beamwidth, whether the wireless medium is occupied, and, in response to detecting that the wireless medium is not occupied, transmitting a message from the second device to the first device on the wireless medium, the message indicating that the wireless medium has been reserved for at least one transmission from the first device to the second device, and the wireless medium has been reserved by the second device detecting based on the first beamwidth that the wireless medium is not occupied.

There is also provided an apparatus comprising at least one processor, at least one memory including computer program code, the at least one memory and the computer program code being configured to, with the at least one processor, cause the apparatus at least to carry out features in accordance with the first and/or second aspect, or any embodiment thereof.

There is further provided an apparatus, comprising means configured for causing the apparatus at least to carry out features in accordance with the first and/or second aspect, or any embodiment thereof. The apparatus may be or comprise the first device or the second device or be configured to control the features of the first device or the second device. The means may comprise at least one processor, and at least one memory including computer program code, the at least one memory and the computer program code being configured to, with the at least one processor, cause the performance of the apparatus.

According to still further aspects, there is provided a computer program and a computer-readable medium, or a non-transitory computer-readable medium, comprising code configured, when executed in a data processing apparatus, to carry out features in accordance with the first and/or second aspect, or an embodiment thereof.

In an embodiment according to the first aspect, the selecting is based at least partly on comparing the first beamwidth indicated in the received message and the second beamwidth.

In an embodiment according to the second aspect, a method, from a set of at least two methods, is selected for the first device to determine whether the wireless medium is occupied. The selecting is based at least partly on comparing the first beamwidth indicated in the received message and the second beamwidth. The selected method for the first device is indicated in the message to the first device.

According to an embodiment of any of the aspects, the message is transmitted for the first device to select a method to determine whether the wireless medium is occupied based at least partly on comparing the first beamwidth and a second beamwidth determined by at least one transmission from the first device to the second device.

According to an embodiment of any of the aspects, the methods in the set of methods have different default transmission gaps indicative of time difference between an end of a transmission burst comprising the message from the second device and a beginning of the at least one transmission from the first device. In response to the second beamwidth exceeding the first beamwidth, a method with a larger transmission gap may thus be selected before performing the at least one transmission.

EMBODIMENTS

Figure 1:
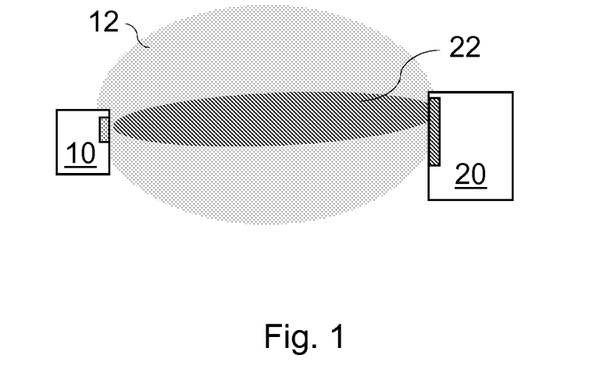
FIG. 1 illustrates a wireless communication system in accordance with at least some embodiments.

FIG. 1 illustrates a simplified example in accordance with at least some embodiments. A first device, such as a user equipment (UE) in the present example 10 communicates wirelessly with a second device, which may be a wireless radio or access network node, hereafter referred to as AN, 20, such as a NodeB, an evolved NodeB (eNB), a Next Generation (NG) NodeB (gNB), a distributed unit of Integrated Access and Backhaul (IAB) node, a base station, an access point, or other suitable wireless/radio access network device or system. The term base station may refer to any one of NodeB, eNB, gNB, or other base station type.

The UE 10 may be attached, connected or associated to a cell and/or network of the AN 20 for wireless communications. The air interface between UE and AN may be configured in accordance with a Radio Access Technology, RAT, which both the UE 10 and AN 20 are configured to support. Examples of cellular RATs include Long Term Evolution, LTE, New Radio, NR, which is also known as fifth generation, 5G, and MulteFire. On the other hand, examples of non-cellular RATs include Wireless Local Area Network, WLAN based RATs. Principles of the present disclosure are not limited to a specific RAT though. For example, in the context of NR, AN 20 may be a gNB while in the context of WLAN, AN 20 may be an access point (or non-access point) station (STA).

The AN 20 may be connected, directly or via at least one intermediate node, with a core network (not shown), such as a Next Generation core network, Evolved Packet Core (EPC), or other network management element. The core network may comprise a set of network functions. A network function may refer to an operational and/or physical entity. The network function may be a specific network node or element, or a specific function or set of functions carried out by one or more entities, such as virtual network elements. For example, a Third Generation Partnership Project (3GPP) 5G core network comprises Access and Mobility Management Function (AMF) which may be configured to terminate RAN control plane (N2) interface and perform registration management, connection management, reachability management, mobility management, access authentication, access authorization, Security Anchor Functionality (SEAF), Security Context Management (SCM), and support for interface for non-3GPP access. The AMF is in charge for managing handovers between gNBs.

The AN 20 may be connected with at least one other AN as well via an inter-base station interface, particularly for supporting mobility of the UE 10 or for backhaul connection, e.g. by 3GPP X2 or similar NG interface. A gNB may consist of a gNB-Control Unit (CU) and one or more gNB-Distributed Units (DUs), and the interface between gNB-CU and gNB-DU is called F1. One gNB-DU may support one or more cells (sector).

The UE 10 may be referred to as a user device or wireless terminal in general. Hence, without limiting to 3GPP User Equipment, the term user equipment is to be understood broadly to cover various mobile/wireless terminal devices, mobile stations and user devices for user communication and/or machine to machine type communication. The UE 10 may be or be comprised by, for example, a smartphone, a cellular phone, a Machine-to-Machine, M2M, node, machine-type communications node, an Internet of Things, IoT, node, a car telemetry unit, a laptop computer, a tablet computer or, indeed, another kind of suitable user device or mobile station, i.e., a terminal. In some further examples embodiments, the first device or UE 10 may be a station of a wireless local area network or a mobile termination (MT) part of an IAB (relay) node.

The devices 10, 20 may be multi-antenna devices and comprise an antenna panel or array for beam-based transmission and reception. The devices may thus be configured to utilize their spatial degrees of freedom for beamforming their transmitted signals and/or placing nulls towards coexisting devices. In general, beamforming uses multiple antennas to control the direction of a wave-front by appropriately weighting the magnitude and phase of individual antenna signals in an array of multiple antennas. In beam-based communication, a directional signal may be transmitted in desired spatial direction by a beam. Beamwidth is generally indicative of spatial width of the beam. Beams may span over the entire cell coverage area and the UE 10 may be switched from one beam to another e.g. due to mobility of the UE (referred also to as beam level mobility). A beam and the beamwidth may be selected or configured for transmission or reception by a transmitting/receiving device itself or by co-operation or control with another device (e.g. the gNB), depending on the system and/or use of the beam.

Listen-Before-Talk (LBT) protocol is a mechanism that allows systems to share an unlicensed band while maintaining the performance of each individual system and device. LBT comprises channel sensing for determining whether a channel is occupied, that is, used by another device or vacant. The channel sensing may comprise measurement or measurements of energy on the channel and comparison of the measured energy against a threshold, for example.

In beam-based systems, such as IEEE 802.11 and/or 3GPP 5G NR beam-based networks coexisting on an unlicensed band, relying on omnidirectional channel sensing may easily lead to overprotective behavior, impairing spatial reuse. Improvements are now provided for beam-based systems facilitating improved channel sensing applying directional channel sensing. A device may perform channel sensing from the intended transmit direction, i.e. using a beam it intends to use for scheduled or planned transmission.

One of the main building blocks in unlicensed operation is a shared channel occupancy time (COT) acquired by a transmitter. With reference to the example of FIG. 2, in a shared COT an initiating device, such as the AN 20, reserves the wireless medium after a successful LBT (LBT1) for a transmission burst or a sequence of transmission bursts. The wireless medium may comprise certain frequency domain allocation, such as a frequency domain defined for 5G NR operation and/or for WLAN operation. The wireless medium may comprise a set of channels for wireless communications, such as one or more channels defined for 5G NR communication and/or channels defined for WLAN communication. The LBT may be performed separately for each of the channels (or it may be possible to carry out LBT jointly for a plurality of channels). For example, 3GPP NR-U at 5 GHz operates with 20 MHz channels. At 60 GHz, the 3GPP NR-U channelization is based on 2.16 GHz bandwidth.

Figure 2:
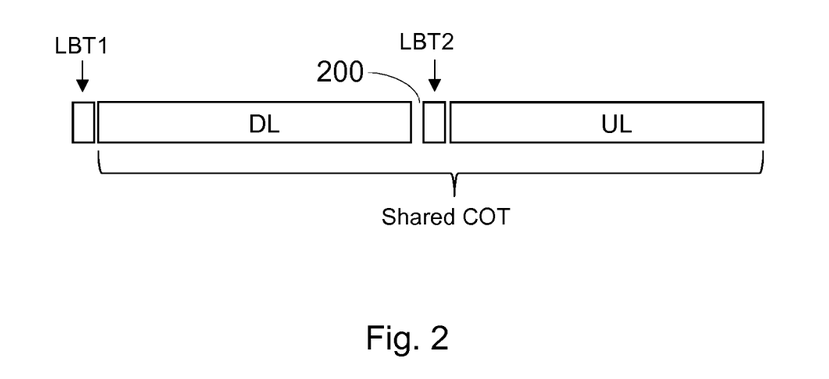
FIG. 2 illustrates a communications example.

The initiating device may perform LBT method (LBT1) using the intended transmit beam as a receive beam. Receive beam here refers to beam pattern used by the device in receiving mode, here to perform the sensing by the LBT method. This receive beam pattern used for the sensing may then be used as transmit beam (pattern) in the transmitting mode of the device. Upon successful beam based LBT1, i.e. upon during LBT1 detecting the wireless medium to be unoccupied, the device actually reserves the wireless medium "within" the transmit beam for the subsequent downlink (DL) transmission.

In a shared COT it is assumed that the uplink (UL) portion can start after the DL portion. A responding device, such as the UE 10, may thus, after a short DL to UL switching gap 200, perform an LBT method (LBT2) to determine if the wireless medium is occupied. The responding device may then initiate UL transmission upon determining that the wireless medium is not occupied. Although not shown in FIG. 2, there can be multiple DL and UL portions in a COT. It is also to be noted that there may be various UL (or DL) transmission scenarios, which may involve use of different (types of) channels or signals or durations.

If the responding device is configured to perform omni-directional channel sensing (e.g. LBT), the responding device may determine the medium as occupied too easily. Thus, it is proposed to use non-omnidirectional or directional channel sensing also for the responding device.

The inventors have identified a problem arising due to different antenna configurations of user devices and base stations, such as 3GPP UEs and gNBs, e.g. due to different form factors, power consumption requirements, and regulations. gNB's and UE's antenna arrays are typically having very different size in terms of antenna elements and thus also the achievable beamwidths are different.

Transmission reception point (TRP) refers generally to an antenna array available to the network located at a specific geographical location. An NR cell may have one or multiple TRPs. One example antenna array in gNB is a 16×16-element array while for UE side the array may be 4×2-element array. Thus, achievable beamwidths may be as illustrated in Table 1:

TABLE 1

Example of achievable 3 dB beamwidths at gNB and UE

|  | gNB | UE |
|---|---|---|
| $1^{st}$ dimension | 6.4° | 25.5° |
| $2^{nd}$ dimension | 6.4° | 51° |

As a consequence, the spatial domain "affected spatial area" may be very different. This is further illustrated in FIG. 1, wherein reference 12 illustrates beam and spatial domain "affected area" of the UE 10 and 22 the beam and spatial domain "affected area" of the AN 20 (in one dimension, e.g. in azimuth).

In the above example, it is questionable whether the UE could for instance transmit uplink control without LBT in the gNB acquired COT if the "affected spatial area" by the UE would be way much larger or wider than by the gNB that performed the first LBT by first beamwidth (LBT1) for the COT. On the other hand, there may also be UEs/responding nodes having similar or even better capability for beamforming as the gNB/initiating device. This might be the case e.g. when considering MT part of an IAB node as the responding device. There is now provided a solution facilitating spatial reuse, in which channel sensing is adapted on the basis of applied transmitter node beamwidth.

Figure 3:
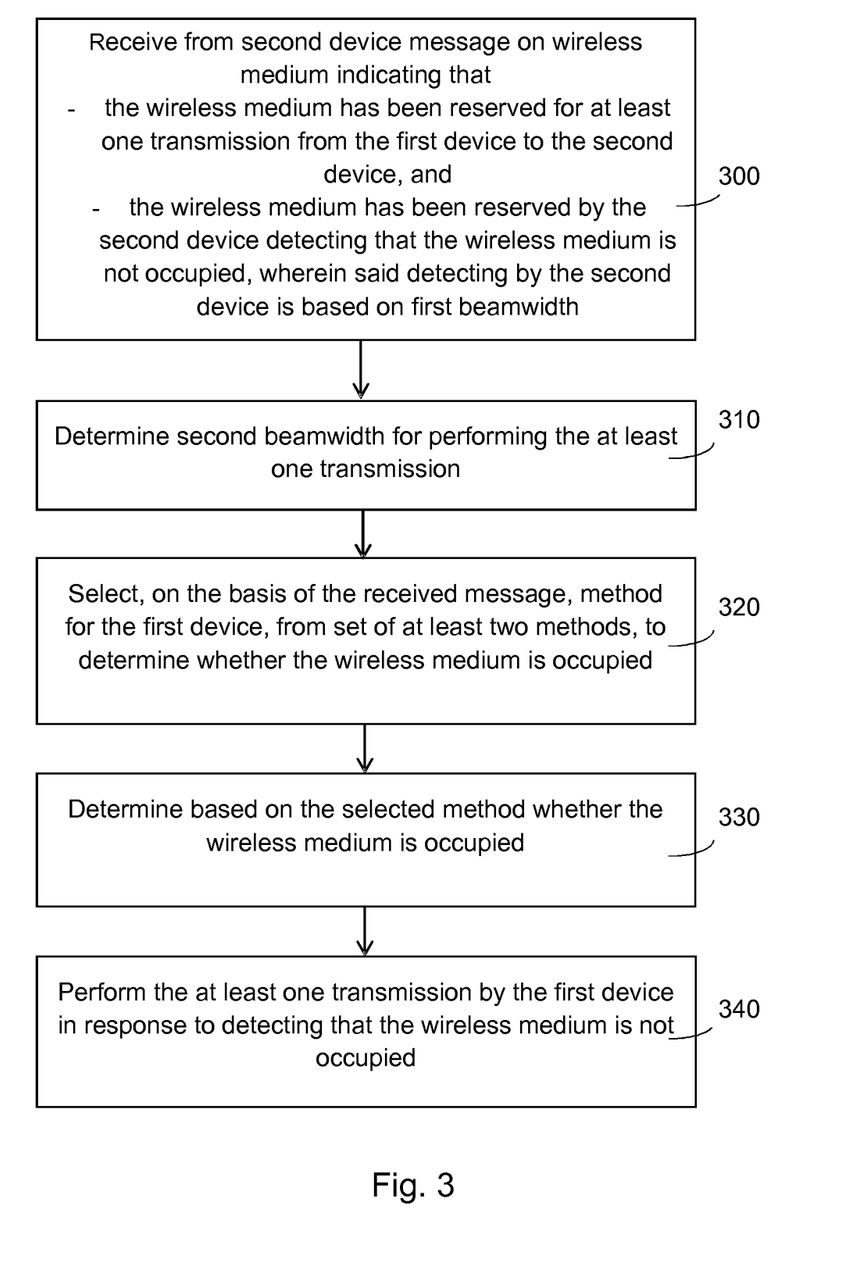
FIGS. 3 and 4 illustrate methods in accordance with at least some embodiments.

FIG. 3 illustrates a method for arranging channel access, particularly for selecting a method for directional channel occupancy detection, which may also be referred to as a channel sensing type or method. The method may be performed in or caused by a wireless communications apparatus or a controller thereof. The method may be carried out by a first device, which may be a responding device (as also cited in the subsequent embodiments), such as the UE 10, communicating with a second device, which may be an initiating device, such as the AN 20.

The method comprises receiving 300, by the first device from the second device, a message on a wireless medium indicating that
  the wireless medium has been reserved for at least one transmission from the first device to the second device, and
  the wireless medium has been reserved by the second device detecting that the wireless medium is not occupied, wherein said detecting by the second device is based on a first beamwidth.

The first device determines 310 a second beamwidth for performing the at least one transmission. The first device selects 320 on the basis of the received message, a method for the first device, from a set of at least two methods, to determine whether the wireless medium is occupied. In some embodiments, the selecting is based at least partly on comparing the first beamwidth indicated in the received message and the second beamwidth. The methods in the set may comprise different LBT or generally channel access or sensing types or configurations. The type of the LBT2 in the example of FIG. 2 may be different than the type of the LBT1. The type of the LBT2 may be selected in block 320 on the basis of at least the information in the received information (directly or indirectly) indicative of the first beamwidth.

The first device, based on the selected method determines 330 whether the wireless medium is occupied. In response to detecting that the wireless medium is not occupied, the first device may perform 340 the at least one transmission, such as the UL transmission in the example of FIG. 2.

Figure 4:
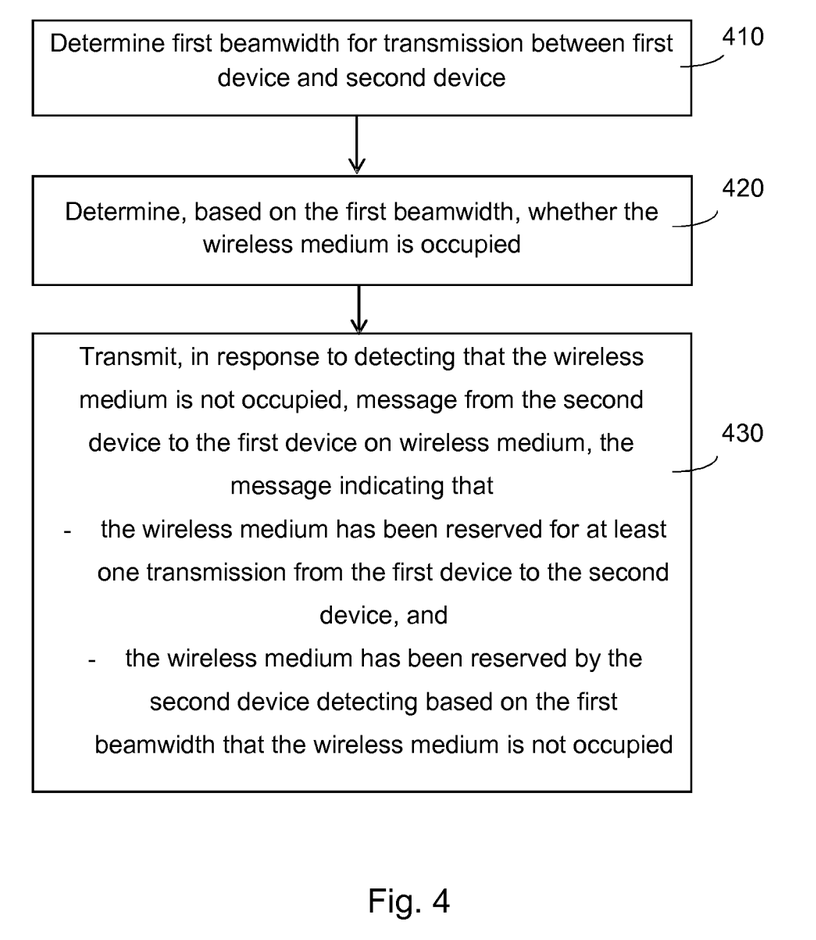

FIG. 4 illustrates a method for facilitating channel access, particularly for facilitating selection of a method for directional channel sensing in unlicensed spectrum. The method may be performed in or caused by a wireless communications apparatus or a controller thereof. The method may be carried out by a second device, which may be an (communication) initiating device, such as the AN 20, communicating with a first device, which may be a respondent device, such as the UE 10.

The method comprises determining 410 a first beamwidth for a transmission between the first device and the second device. The second device may determine 420, based on the first beamwidth, whether the wireless medium is occupied. In response to detecting that the wireless medium is not occupied, a message is transmitted 430 from the second device to the first device on the wireless medium, the message indicating that:
  the wireless medium has been reserved for at least one transmission from the first device to the second device, and the wireless medium has been reserved by the second device detecting based on the first beamwidth that the wireless medium is not occupied.

The first, respondent device performing the method of FIG. 3 may on the basis of the received message select a channel sensing method, such as an LBT appropriate given the difference in the beamwidths (and hence the affected spatial areas).

For example, if the second beamwidth exceeds the first beamwidth, the first device selects in block 320 a ("heavier") channel access method providing higher likelihood or detection certainty for wireless medium availability (i.e. higher than another method in the set). The higher likelihood for wireless medium availability may be achieved for example by employing a collision avoidance mechanism. The mechanism may comprise e.g. carrying out a random number of sequential channel availability measurements, also referred to as random back-off. The range of random back-off may be confined to a contention window.

In another example situation, the first device detects that the second device has sensed its surroundings over a wide first beamwidth (e.g. wider than the second beamwidth). The wireless medium is thus more likely not occupied for the transmission of the first device, and the first device may apply more "light" channel sensing or access method, even immediate transmission.

Thus, the method of FIG. 4 and the message facilitates the first, respondent device selecting the channel sensing method adaptively, depending on the capabilities and the first beamwidth applied by the second, initiating device for channel sensing. The present features facilitate to achieve increased spatial reuse, more efficient but also fair beam based LBT methods or other channel sensing methods. It will be appreciated that there may be various further features and blocks in connection with the method of FIGS. 3 and 4. Some example embodiments are illustrated below.

In some embodiments, the set of methods comprises a first method with a first transmission gap and a second method with a second transmission gap, the transmission gaps being indicative of time difference between end of a (downlink or uplink) transmission comprising the message from the second device and the beginning of the at least one (uplink or downlink) transmission from the first device, such as the gap 200 in FIG. 2. The first transmission gap may be smaller than the second transmission gap and the second method is selected in response to the second beamwidth exceeding the first beamwidth. Thus the first device will wait later (than with the first method), whereby the wireless medium is more likely not reserved. For example, the first transmission gap may be 16 microseconds, and the second transmission gap may be 25 microseconds. The first method may be selected 320 in response to the second beamwidth being comparable to or smaller than the first beamwidth. It will be appreciated that these are just simple examples, and various rules, thresholds, and/or categories may be applied in order to adapt the method selection, some of which will be illustrated below.

In some embodiments, the second device may select a method for the second device, from a set of at least two methods, to determine in block 420 whether the wireless medium is occupied. This method selection may be dependent on or selected on the basis of the first beamwidth. The second device may then in block 420 determine, based on the second method whether the wireless medium is occupied.

The message may comprise an indication of a method for the second device, from the set of at least two methods, applied by the second device for determining in block 420 that the wireless medium is not occupied. The selection 320 of the method for the first device may be based on the received indication of the second method applied by the second device. The message (of block 300 and 430) may indicate an LBT type or category, for example.

In some embodiments, two or more beamdwidth classes are pre-configured and a beamwidth indication is applied for the method selection. The message may indicate beamdwidth class of the first beamwidth, and the method may be selected 320 by the first device based on the beamwidth class indication in the message. Thus, in a simple example of a set of at least two beamwidth classes, a first beamwidth class may be defined for the first beamwidth and a second beamwidth class may be defined for the second beamwidth, and the method may be selected on the basis of comparison of the first beamwidth class and the second beamwidth class.

For example, beamwidth classes similar to as illustrated below could be used (only one dimension being considered for simplicity):

Class A: narrow beamwidth, e.g. below 13° per dimension (azimuth and elevation)

Class B: medium beamwidth, e.g. between 13° and 52°

Class C: wide beamwidth, e.g. above 52°

In some embodiments, the second device, which may perform the method of FIG. 4, may be further configured to select a method, from a set of at least two methods, for the first device to determine whether the wireless medium is occupied. The selection may be based at least partly on comparing the first beamwidth and a second beamwidth, to be used by the first device for the at least one transmission, the second beamwidth being known a priori by the second device. The method selected by the second device may be indicated in the message 430 to the first device. The first device may then in block 320 select the method in accordance with the indication. For example, the message may indicate an LBT type or category selected for the first device by the second device.

In some embodiments, a signal or energy detection threshold is adapted for determining whether the wireless medium is occupied on the basis of the selected method. Thus, different methods (e.g. LBT types illustrated above) may be associated with different detection thresholds, and the detection threshold may vary according to the first and/or second beamwidth. The detection threshold may be lower for smaller beamwidth than for larger beamwidth. Alternatively, the threshold may be the same for different methods.

The set of at least two methods may comprise channel access schemes of one or more of: a) immediate transmission after a short switching gap from reception to transmission, b) listen-before-talk without random back-off, c) listen-before-talk with random back-off with contention window of fixed size, and d) listen-before-talk with random back-off with contention window of variable size. For example, in case a method providing higher likelihood for wireless medium availability e.g. due to the second beamwidth being wider than the first beamwidth, c) or d) is selected instead of a) or b). For example, with reference to FIG. 2, the AN 20 may select c) or d) for the LBT1 and the UE 10 may select (based on the received message) a) or b) for the LBT2.

In some embodiments, as already illustrated, presently disclosed features are applied for accessing unlicensed wireless medium by 3GPP 5G system. Current NR Release 15 defines operation for frequencies up to 52.6 GHz. Unlicensed band access beyond 52.6 GHz, around 60 GHz is also being studied. Some further example embodiments for 3GPP 5G based systems are illustrated below.

In an example embodiment, at least some of 5G channel access schemes for LBT types or categories are applied as the methods, as such or as modified. Such access schemes may include one or more of category 1 immediate transmission and two or more further LBT categories, which may be defined in channel access schemes of 3GPP TR 38.889, such as categories illustrated in Tables 2 and 3.

TABLE 2

Example channel access schemes for initiating a COT by gNB as load-bearing equipment (LBE) device

| | Cat 2 LBT | Cat 4 LBT |
|---|---|---|
| DRS alone or multiplexed with non-unicast data (e.g. OSI, paging, RAR) | When the DRS duty cycle ≤1/20, and the total duration is up to 1 ms: 25 μs Cat 2 LBT is used (as in LAA) | When DRS duty cycle is >1/20, or total duration >1 ms |
| DRS multiplexed with unicast data | N/A (except potentially for certain control messages) | Channel access priority class is selected according to the multiplexed data |
| PDCCH and PDSCH | N/A (except potentially for certain control messages) | Channel access priority class is selected according to the multiplexed data |

TABLE 3

Example channel access schemes for responding device within a COT initiated by gNB as LBE device

| Cat 1 Immediate transmission | Cat 2 LBT | Cat 4 LBT |
|---|---|---|
| When the gap from the end of the DL transmission to the beginning of the UL burst is not more than 16 msec. | For any of the following cases: When the gap between any two successive scheduled/granted transmissions in the COT is not greater than 25 msec For the case where a UL transmission in the gNB initiated COT is not followed by a DL transmission in the same COT Note: the duration from the start of the first transmission within the channel occupancy until the end of the last transmission in the same channel occupancy may be required not to exceed 20 ms. | N/A |

For example, the following LBT or channel access (CA) types could be defined (from a "lighter" method providing least certainty or likelihood for wireless medium availability to a "heavy" method providing most certainty or likelihood):
  Type 1, e.g. immediate channel access with no channel sensing/LBT
    Default transmission gap may be $T_1$
  Type 2, e.g. similar to 3GPP CAT 2 LBT
    Default transmission gap may be $T_2$
  Type 3, e.g. similar to 3GPP CAT 4 LBT
    Default transmission gap may be $T_3$
  wherein $T_1 < T_2 < T_3$.

Below some further examples and implementation options are illustrated, also with reference to the above example beamwidth classes and LBT/CA types. It will be appreciated that the features may be applied in various combinations with earlier illustrated embodiments other types, without in any way being limited to e.g. the presently disclosed particular beamwidth classes and/or LBT/CA types.

Example Options for LBT/CA Type Selection at Second, Initiating Device
Option 1:
  Second device's LBT beamwidth (as well as DL transmission beamwidth) fulfills Class A→Second device's LBT/CA type can be Type 1
    Use of LBT 1 may be further limited with a shorter maximum COT time than with other "heavier" LBT types.
  Second device's LBT beamwidth fulfills Class B→Second device's LBT/CA type to be at least Type 2.
  Second device's LBT beamwidth fulfills Class C→Second device' LBT/CA type to be at least Type 3.
Option 2:
  Second device's LBT beamwidth fulfills Class A Second device's LBT/CA type to be at least Type 2
  Second device's LBT beamwidth fulfills Class B or C Second device's LBT/CA type to be at least Type 3.

Example Options for LBT/CA Type Selection by First, Responding Device
  The first device may detect second device's transmission, which may include an indication about the used LBT beamwidth (and corresponding LBT/CA type), or in general the applied coexistence method (e.g. channel sensing type) by the second device. The indication may also include the DL RS that characterizes the used downlink beam (direction). The responding device may determine the LBT/CA type for its transmission in the COT, e.g. as follows:
    if the beamwidth of the responding device is comparable to or more narrow than the LBT beamwidth of the initiating (second) device, the responding device performs intended transmission using lighter LBT/CA type (e.g. Type 1 or Type 2 if initiating device has performed Type 2 or Type 3) or lighter channel sensing type.
    else the responding device applies a "heavy" LBT/CA type (e.g. Type 3).
  As an alternative example, responding device determines the LBT/CA type for its transmission in the COT as follows:
    if the initiating device has sensed its surroundings over a wide or omni LBT beamwidth and found the channel available, the responding device performs intended transmission using lighter LBT/CA type (e.g. Type 1 or Type 2 if initiating device has performed Type 2 or Type 3) or lighter type.
    else the responding device applies a "heavy" LBT/CA type (e.g. Type 3).

In an embodiment, the first method is selected in block 320 on the basis of determining whether beam of the at least one transmission by the first device will be to a direction reciprocal to a beam comprising the received message. Thus, the LBT/CA type may depend whether the responding device is to transmit to a direction reciprocal to the initiating device's beam direction. If the responding device is (scheduled) to transmit to another beam direction than reciprocal to the initiating device's beam direction, the responding device may apply a more comprehensive or "heavier" LBT/CA type with higher likelihood or detection certainty for wireless medium availability.

Such reciprocal condition in "beam directions" can be determined based on spatial source reference signals (RSs) to determine RX beam and TX beam at the responding device. The responding device (e.g. the UE 10) can be configured by the initiating device (e.g. the gNB) with DL RSs (spatial source RSs) for determining RX beams for DL reception and for determining TX beams for UL transmission. For RX and TX beam determination, the RS can be e.g. a synchronization signal and broadcast channel block (SSB) or channel state information-RS (CSI-RS) in NR-based system. For example, if the gNB now indicates that UE would use the same DL RS to determine both RX beam for DL reception and TX beam for UL transmission (responding device), the UE can determine that this is a reciprocal condition (UE would transmit to same direction as from where it receives). Otherwise, if different DL RSs are controlled to be used for RX beam and TX beam, the UE determines non-reciprocal condition (and those RSs are not correlating in spatial domain).

The message in block 300, 430 may be included in a burst or a frame in accordance with the applied signaling interface between the devices 10, 20. At least some of the above illustrated information may be added in a new information element or added in an existing information element of an applicable message.

Figure 5:
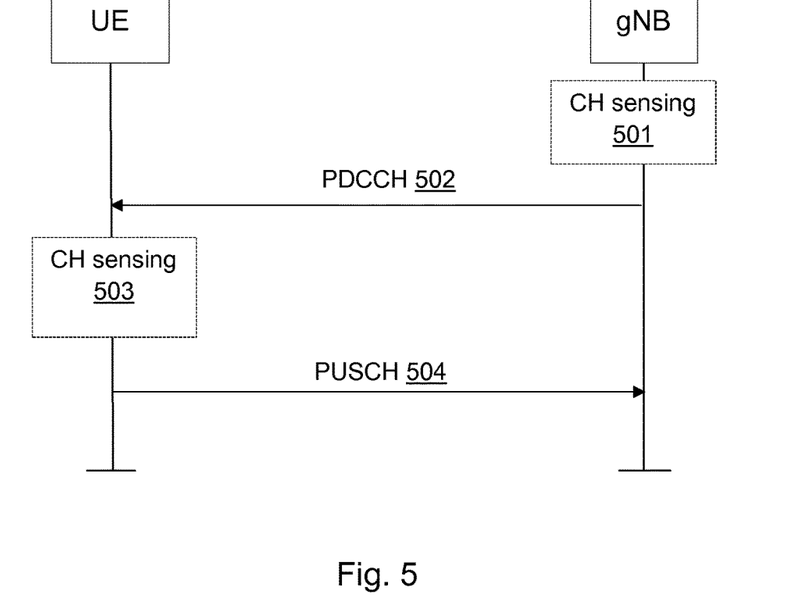
FIGS. 5 and 6 illustrate signaling examples in accordance with at least some embodiments.

In an example embodiment, with reference to FIG. 5, a gNB performs channel sensing 501 applying the features illustrated in connection with FIG. 4 and generates and sends (430) the message as or in a physical downlink control channel (PDCCH) message 502. The PDCCH message may comprise a downlink control information field indicative of channel occupancy time for the at least transmission and the first beamwidth. Based on the PDCCH message, the UE selects (320) the method, determines 503 channel occupancy, and may carry out uplink transmission by a physical uplink shared channel (PUSCH) message 504.

However, it will be appreciated that in some alternative embodiments, the AN 20 may operate as the first, responding device and the UE 10 as the second, initiating device. The UE may acquire a shared COT based on the first beamwidth and the AN performing the method of FIG. 3 may based on the message received from the UE select the LBT for subsequent downlink transmission. Thus, the message in block 300 and 430 may be an uplink transmission burst, such as a PUSCH based on configured grant framework (using resources configured via RRC signaling). For example, the UE may perform CAT 4 LBT at block 420 and gNB may select in block 320 CAT 2 LBT for transmitting DL response.

In some embodiments, multi-beamwidth channel sensing or LBT is applied in block 320 and/or 420. Thus, the detecting of non-occupancy of the wireless medium by the second device may be further based on one or more further (third) beamwidths, such as omni-directional beamwidth or another beamwidth differing from the first beamwidth.

The second device may be configured to indicate such third beamwidth to the first device. The method selection in block 320 may be based on the received indication of the third beamwidth. For example, the UE 10 may select 320 the method further on the basis of detecting based of the received message that the AN 20 has detected the medium to be unoccupied further based on omnidirectional sensing. Some further example embodiments are illustrated below.

The second device, i.e. the initiating device of the COT may perform two (or even more) LBT methods or events in consecutive manner. For example, one LBT may be with omni-pattern or a wide beam and another LBT may be beam-based. The methods may be of different LBT/CA types. The methods may have different energy detection thresholds.

In an example embodiment, the second device may apply at least one of the three strategies to initiate the COT:
1. Omnidirectional LBT (wireless medium occupancy determination) is OK and beam-based LBT is not ok (NOK). This means that the channel is detected to be available around the second device while the channel is occupied more far away in a particular direction of the beam from the second device. Thus the second device may indicate in the message 300, 430 spatial type of LBT being omnidirectional. The indication may be provided e.g. in group-common PDCCH used to indicate COT structure (e.g. length of DL part/time until end of DL part and length of UL part). The first device may based on the indication determine that a "light" LBT/CA type (e.g. Type 1) can be used for the transmission.
2. Omnidirectional LBT NOK and the beam-based OK. The second device may indicate in the message COT spatial type of LBT being beam based. Also beamwidth class may be provided, such as class A, B or C. The first device may determine required LBT/CA type based on indicated spatial type of LBT being used by the second device. If first device's beamwidth class would be higher than the second device's the first device may apply "heavier" spatial LBT/CA type, e.g. Type 3.
3. Omnidirectional LBT OK and beam based OK. The second device may thus indicate in the COT spatial type of LBT being omnidirectional. The indication may be provided e.g. in group-common PDCCH used to indicate COT structure (e.g. length of DL part/time until end of DL part and length of UL part), The first device may determine that a light LBT/CA type (e.g. Type 1) can be used for the transmission with any applied beamwidth.

It is possible to apply different methods by the second device for wireless medium occupancy detection for transmitting the message to the first device and for the wireless medium reservation for the transmission from the first device. In a further example embodiment, the second device may apply above-illustrated features for using the first LBT/CA type (omnidirectional) for the DL transmission part and the second LBT/CA type (beam-based) for declaring certain beam direction to be free for the uplink direction.

The second device may perform two or more wireless medium occupancy detection events for different directions, with same or differing beamwidths. The events may be of the same or different method, among the set of methods. The second device may thus indicate non-occupied beam directions from receiver point of view.

For example, the gNB may perform multiple beam based LBT procedures consecutively, testing different beam directions. The gNB may indicate in the downlink part of the COT e.g. beam direction(s) and corresponding transmission resources for random access preambles for which gNB was able to detect channel being non-occupied. This may include predefined time period how long beam based LBTs are effective, such as time allowed from the performed LBTs until the RACH resources. The first device may apply this received information for configuring the transmission, and apply at least some of the above-illustrated features to select the method for wireless medium occupancy detection based on the received message (e.g. select LBT type on the basis of beamwidth difference between gNB and UE).

In a further example embodiment, a multi-beamwidth channel sensing operation is considered where the second, initiating device of the COT performs two channel sensing methods in consecutive manner (which may have different energy detection thresholds):

one using omni-pattern or a beam sweeping over the free space around the second device (E.g. a node mounted on a wall may be configured however to exclude directions towards the wall).

another one using second device transmission beam(s) for channel sensing.

For example, the second device may be configured to initiate the COT based on the outcomes of the methods by:

omni-pattern NOK and beam based (wireless medium occupancy determination) OK. The initiating device indicates in the COT spatial type of channel sensing being transmission beam based. The responding device determines required sensing type based on indicated sensing type of the initiating device. As the second device has used beam based sensing, the first device selects a "heavier" sensing type, e.g. Tx beam or omni based sensing.

omni-pattern OK and beam based determination OK. The second device indicates in the COT spatial type of channel sensing being omnidirectional. The first device may thus select a "light" sensing type (e.g. no sensing) can be used for the transmission.

In some embodiments, the UE 10 comprises a wireless local area network (WLAN) transceiver, which may be configured to operate as a station (STA) in an IEEE 802.11-based WLAN. Thus, the STA may be associated with a basic service set (BSS) which is a basic building block of IEEE 802.11-based WLANs. The most common BSS type is an infrastructure BSS that includes a single access point (AP) together with all STAs associated with the AP. The device 10, 20 may be configured to operate as an AP or a non-AP STA. The AP may be a fixed AP or a mobile AP.

Clear channel assessment (CCA) is applied for determining if WLAN medium is idle or not. The CCA includes carrier sense and energy detection functions, wherein carrier sense refers generally to ability of the receiver to detect and decode WLAN signal preamble. Network allocation vector (NAV) is a virtual carrier-sensing mechanism used in wireless network protocols, such as IEEE 802.11 based systems, and is a logical abstraction that limits the need for physical carrier-sensing at the air interface to save power. The MAC layer frame headers contain a duration field that specifies the transmission time required for the communication. In addition, the PLCP header also carries information relevant for determining the duration of the frame being transmitted. Wireless devices listening to the wireless medium read this information and back off accordingly.

Figure 6:
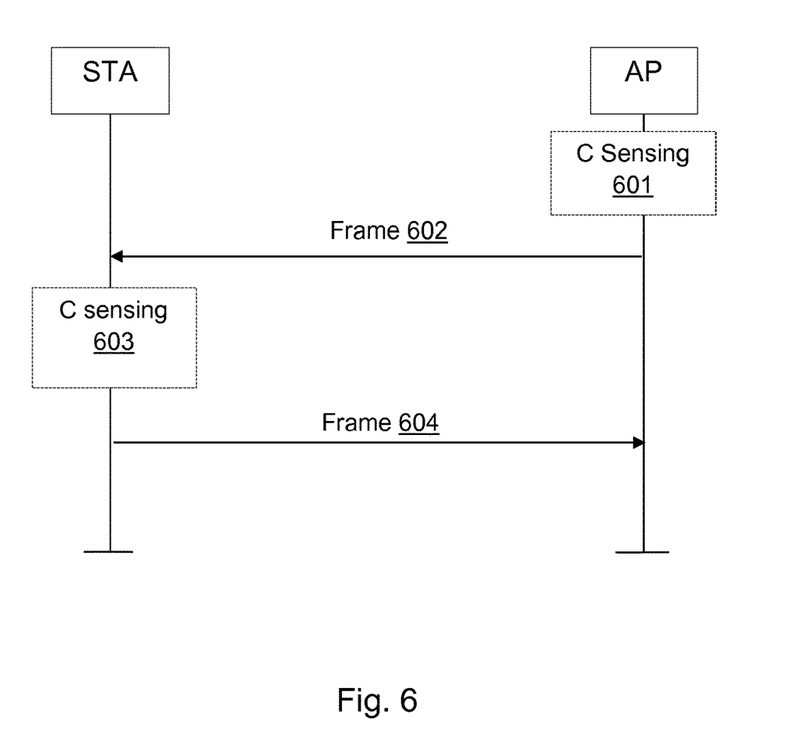

FIG. 6 illustrates a simplified example of an embodiment for a WLAN based system. The AP may, upon detecting based on channel or carrier sensing 601 based on the applied first beamwidth, that the wireless medium is not occupied, send a 802.11 frame 602, such as a request-to-send (RTS) frame or a data frame, as the message of block 430/300. Upon detecting the wireless medium to be unoccupied on the basis of a method selected based on the frame 602, the STA may send an 802.11 frame 604. There may be coexisting wireless communication networks, which may be of different RATs. For example, there may be a wireless local area network (WLAN) and a cellular network, such as a 5G NR Unlicensed (NR-U) network, coexisting in the same unlicensed band. Various scenarios of coexistence are facilitated, for example, wherein a gNB is neighbour to a Wi-Fi AP. The methods enable benefits also for relay-type network nodes. For example, 3GPP integrated access backhaul (IAB) relays, and Wi-Fi relays/bridges may be configured to apply at least some of the above-illustrated embodiments.

In some embodiments, the AN 20 is (or is configured to operate as) a gNodeB (gNB) comprising an NR-U transceiver, i.e. a communications unit configured to operate in unlicensed spectrum on the basis of 3GPP NR based access, and a Wi-Fi AP.

In a further embodiment, the devices 10, 20 are configured to support 802.11ax based WLAN. Examples of millimetre-wave 802.11 based systems, in which at least some of the above illustrated features may be applied, include WiGiG (also known as 60 GHz Wi-Fi) based on IEEE 802.11ad and/or 802.11ay standards.

While some embodiments have been described in the context of 5G NR-U and WLAN/IEEE 802.11 based systems, it should be appreciated that these or other embodiments of the invention may be applicable in connection with other technologies configured to operate on licensed or non-licensed band, such as with wireless devices operating according to other local-connectivity technologies, other existing or future versions of the IEEE 802.11, 6G cellular systems, or other existing or future technologies facilitating spatial reuse. Further, although LBT has been referred in above illustrated embodiments, also other methods for coexistence and channel access may be used. For example, the duty cycle based coexistence method may be applied, wherein allowed duty cycle for the first device and/or the second device may be dependent on the applied first and/or second beamwidth.

An electronic device comprising electronic circuitries may be an apparatus for realizing at least some embodiments of the present invention. The apparatus may be or may be comprised in a computer, a laptop, a tablet computer, a cellular phone, a machine to machine (M2M) device (e.g. an IoT sensor device), a base station, an access point or node device or any other apparatus provided with radio communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

As used in this application, the term "circuitry" may refer to one or more or all of the following:

(a) hardware-only circuit implementations (such as implementations in only analog and/or digital circuitry) and     (b) combinations of hardware circuits and software, such as (as applicable):

(i) a combination of analog and/or digital hardware circuit(s) with software/firmware and         (ii) any portions of hardware processor(s) with software (including digital signal processor(s)), software, and memory(ies) that work together to cause an apparatus, such as a mobile phone or server, to perform various functions) and     (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 7:
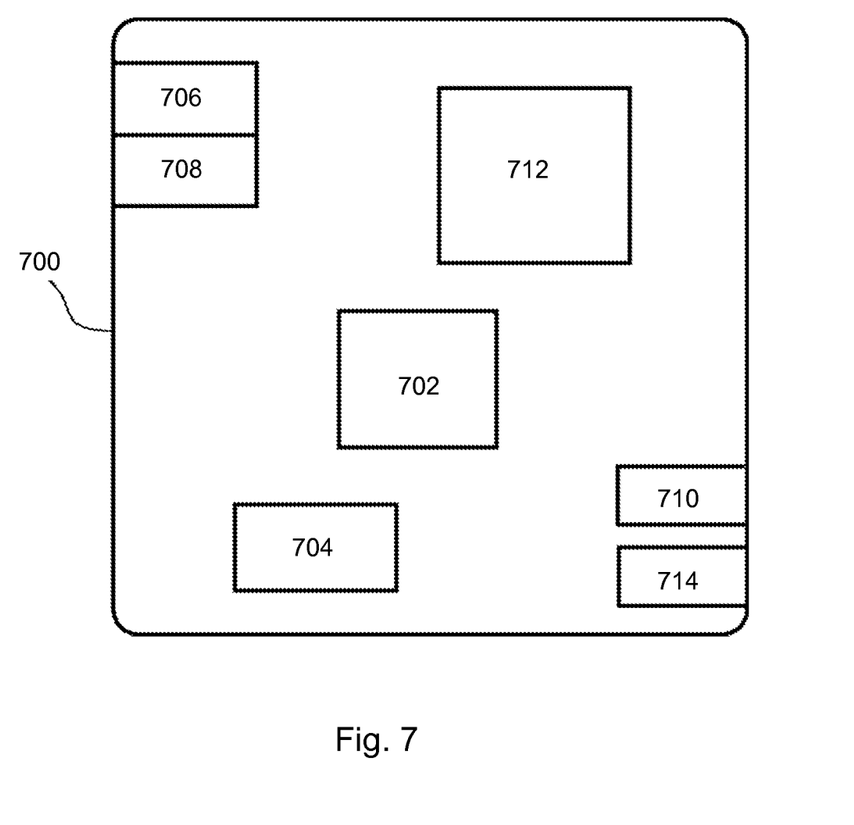
FIG. 7 illustrates an example apparatus capable of supporting at least some embodiments.

FIG. 7 illustrates an example apparatus capable of supporting at least some embodiments of the present invention. Illustrated is a device 700, which may comprise a communications device arranged to operate as the first device or the second device, or the UE 10 or the AN 20, for example. The device may include one or more controllers configured to carry out operations in accordance with at least some of the embodiments illustrated above, such as some or more of the features illustrated above in connection with FIGS. 2 to 6. The device may be configured to operate as the apparatus configured to carry out the method of FIG. 3 or 4, for example.

Comprised in the device 700 is a processor 702, which may comprise, for example, a single- or multi-core processor wherein a single-core processor comprises one processing core and a multi-core processor comprises more than one processing core. The processor 702 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 700 may comprise memory 704. The memory may comprise random-access memory and/or permanent memory. The memory may comprise at least one RAM chip. The memory may comprise solid-state, magnetic, optical and/or holographic memory, for example. The memory may be at least in part accessible to the processor 702. The memory may be at least in part comprised in the processor 702. The memory 704 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 700 but accessible to the device. For example, control parameters affecting operations related to the wireless medium occupancy method selection may be stored in one or more portions of the memory and used to control operation of the apparatus. Further, the memory may comprise device-specific cryptographic information, such as secret and public key of the device 700.

The device 700 may comprise a 1st transceiver 706 of the 1st RAT. The device may comprise a 2nd transceiver 708 of the 2nd RAT. The transceiver 706, 708 may be configured to operate in accordance with a wireless, cellular or non-cellular standard, such as wideband code division multiple access, WCDMA, long term evolution, LTE, 5G or other cellular communications systems, and/or a WLAN standard, for example. The device 700 may comprise a near-field communication, NFC, transceiver 710. The NFC transceiver may support at least one NFC technology, such as NFC, Bluetooth, Wibree or similar technologies.

The device 700 may comprise user interface, UI, 712. The UI may comprise at least one of a display, a keyboard, a touchscreen, a vibrator arranged to signal to a user by causing the device to vibrate, a speaker and a microphone. A user may be able to operate the device via the UI, for example to configure or control the device.

The device 700 may comprise or be arranged to accept a user identity module or other type of memory module 714. The user identity module may comprise, for example, a subscriber identity module, SIM, and/or a personal identification IC card installable in the device 700. The user identity module 714 may comprise information identifying a subscription of a user of device 700. The user identity module 714 may comprise cryptographic information usable to verify the identity of a user of device 700 and/or to facilitate encryption and decryption of communication effected via the device 700.

The processor 702 may be furnished with a transmitter arranged to output information from the processor, via electrical leads internal to the device 700, to other devices comprised in the device. Such a transmitter may comprise a serial bus transmitter arranged to, for example, output information via at least one electrical lead to memory 704 for storage therein. Alternatively to a serial bus, the transmitter may comprise a parallel bus transmitter. Likewise the processor may comprise a receiver arranged to receive information in the processor, via electrical leads internal to the device 700, from other devices comprised in the device 700. Such a receiver may comprise a serial bus receiver arranged to, for example, receive information via at least one electrical lead from the transceiver 706, 708 for processing in the processor. Alternatively to a serial bus, the receiver may comprise a parallel bus receiver.

The device 700 may comprise further devices not illustrated in FIG. 7. For example, the device may comprise at least one digital camera. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 710 and/or the user identity module 714.

The processor 702, the memory 704, the transceiver 706, 708, the NFC transceiver 710, the UI 712 and/or the user identity module 714 may be interconnected by electrical leads internal to the device 700 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or functional features may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof.

Furthermore, the described features, structures, or characteristics may be combined in any suitable manner in one or more embodiments. In the preceding description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising:
   at least one processor; and
   at least one memory including computer program code;
   the at least one memory and the computer program code configured to, with the at least one processor, cause the apparatus at least to:
   receive, from a second device, a message on a wireless medium indicating that the wireless medium has been reserved for at least one transmission to the second device, and the wireless medium has been reserved by the second device detecting that the wireless medium is not occupied, wherein said detecting by the second device is based on a first beamwidth
   determine a second beamwidth for performing the at least one transmission;
   compare the first beamwidth indicated in the received message and the second beamwidth;
   based on the comparing, select a method from a set of at least two methods, to determine whether the wireless medium is occupied,
      wherein the set of at least two methods comprise channel access schemes of the following: immediate transmission after a short switching gap from reception to transmission, listen-before-talk without random back-off, listen-before-talk with random back-off with contention window of fixed size, and listen-before-talk with random back-off with contention window of variable size,
      wherein the set of at least two methods comprises a first method with a first transmission gap and a second method with a second transmission gap, the first transmission gap and the second transmission gap being indicative of time difference between end of a transmission comprising the message from the second device and a beginning of the at least one transmission, wherein the first transmission gap is smaller than the second transmission gap, and
      wherein the second method is selected in part in response to the second beamwidth exceeding the first beamwidth and wherein the first method is selected in part in response to the second beamwidth being comparable to or smaller than the first beamwidth;
   determine, based on the selected method, whether the wireless medium is occupied; and
   in response to detecting that the wireless medium is not occupied, perform the at least one transmission.

2. The apparatus of claim 1, wherein the message comprises an indication of a method for the second device, from the set of at least two methods, applied by the second device for said detecting that the wireless medium is not occupied, and the selecting of the method to determine whether the wireless medium is occupied is further based on the received indication of the method for the second device.

3. The apparatus of claim 1, wherein the message indicates beamwidth class of the first beamwidth, and the selection of the method for the first device is further based on the beamwidth class indication in the message.

4. The apparatus of claim 1, wherein the selecting of the method is further based on determining whether beam of the at least one transmission will be to a direction reciprocal to a beam comprising the received message.

5. The apparatus of claim 1, wherein the message indicates a listen-before-talk type for obtaining channel occupancy time.

6. The apparatus of claim 1, wherein the at least one memory and the computer program code are further configured to, with the at least one processor, cause the apparatus to: adapt a signal or energy detection threshold for determining whether the wireless medium is occupied based on the selected method.

7. The apparatus of claim 1, wherein the message is a physical downlink control channel message comprising a downlink control information field indicative of channel occupancy time for the at least transmission and the first beamwidth.

8. The apparatus of claim 1, wherein the apparatus is a user equipment and the second device is an access network node.

9. The apparatus of claim 1, wherein the apparatus comprises at least one of a new radio unlicensed transceiver configured to operate on the wireless medium or a wireless local area network transceiver configured to operate on the wireless medium.

10. A user equipment comprising:
    at least one processor; and
    at least one memory comprising computer-executable instructions that, when executed by the at least one processor, cause the at least on processor to perform the following operations:
    receive, from a first device, a message on a wireless medium indicating that the wireless medium has been reserved for at least one transmission to the first device, and the wireless medium has been reserved by the first device detecting that the wireless medium is not occupied, wherein said detecting by the first device is based on a first beamwidth
    determine a second beamwidth for performing the at least one transmission;

compare the first beamwidth indicated in the received message and the second beamwidth;
based on the comparing, select a method from a set of at least two methods, to determine whether the wireless medium is occupied,
wherein the set of at least two methods comprise channel access schemes of the following: immediate transmission after a short switching gap from reception to transmission, listen-before-talk without random back-off, listen-before-talk with random back-off with contention window of fixed size, and listen-before-talk with random back-off with contention window of variable size,
wherein the set of at least two methods comprises a first method with a first transmission gap and a second method with a second transmission gap, the first transmission gap and the second transmission gap being indicative of time difference between end of a transmission comprising the message from the first device and a beginning of the at least one transmission, wherein the first transmission gap is smaller than the second transmission gap, and
wherein the second method is selected in part in response to the second beamwidth exceeding the first beamwidth and wherein the first method is selected in part in response to the second beamwidth being comparable to or smaller than the first beamwidth;
determine, based on the selected method, whether the wireless medium is occupied; and
in response to detecting that the wireless medium is not occupied, perform the at least one transmission.

11. The user equipment of claim 10, wherein the message is a physical downlink control channel message comprising a downlink control information field indicative of channel occupancy time for the at least transmission and the first beamwidth.

12. The user equipment of claim 10, wherein the message indicates a listen-before-talk type for obtaining channel occupancy time.

13. The user equipment of claim 10, wherein the first device is an access network node.

14. A method, comprising:
receiving, by user equipment from a second device, a message on a wireless medium indicating that the wireless medium has been reserved for at least one transmission from the first device to the second device, and the wireless medium has been reserved by the second device detecting that the wireless medium is not occupied, wherein said detecting by the second device is based on a first beamwidth
determining, by the user equipment, a second beamwidth for performing the at least one transmission;
comparing, by the user equipment, the first beamwidth indicated in the received message and the second beamwidth;
based on the comparing, selecting, by the user equipment, a method from a set of at least two methods, to determine whether the wireless medium is occupied,
wherein the set of at least two methods comprise channel access schemes of the following: immediate transmission after a short switching gap from reception to transmission, listen-before-talk without random back-off, listen-before-talk with random back-off with contention window of fixed size, and listen-before-talk with random back-off with contention window of variable size,
wherein the set of at least two methods comprises a first method with a first transmission gap and a second method with a second transmission gap, the first transmission gap and the second transmission gap being indicative of time difference between end of a transmission comprising the message from the second device and a beginning of the at least one transmission, wherein the first transmission gap is smaller than the second transmission gap, and
wherein the second method is selected in part in response to the second beamwidth exceeding the first beamwidth and wherein the first method is selected in part in response to the second beamwidth being comparable to or smaller than the first beamwidth;
determining, by the user equipment based on the selected method, whether the wireless medium is occupied; and
in response to detecting that the wireless medium is not occupied, performing, by the user equipment, the at least one transmission.

15. The method of claim 14, wherein the message is a physical downlink control channel message comprising a downlink control information field indicative of channel occupancy time for the at least transmission and the first beamwidth.

16. The method of claim 14, wherein the message comprises an indication of a method for the second device, from the set of at least two methods, applied by the second device for said detecting that the wireless medium is not occupied, and the selecting of the method for the first device to determine whether the wireless medium is occupied is further based on the received indication of the method for the second device.

17. The method of claim 14, wherein the message indicates a listen-before-talk type for obtaining channel occupancy time.

18. The method of claim 14, wherein the second device is an access network node.

19. The method of claim 14, further comprising adapting, by the user equipment, a signal or energy detection threshold for determining whether the wireless medium is occupied based on the selected method.

20. The method of claim 14, wherein the selecting of the method is further based on determining whether beam of the at least one transmission will be to a direction reciprocal to a beam comprising the received message.

* * * * *